(12) United States Patent  (10) Patent No.: US 9,027,483 B2
Van Polen  (45) Date of Patent: May 12, 2015

(54) FLOW BATTERY POWER CONVERTER

(75) Inventor: Jerry Van Polen, Oak Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 324 days.

(21) Appl. No.: 13/444,522

(22) Filed: Apr. 11, 2012

(65) Prior Publication Data

US 2013/0269566 A1  Oct. 17, 2013

(51) Int. Cl.
  *B61C 17/00* (2006.01)
(52) U.S. Cl.
  CPC ..................................... *B61C 17/00* (2013.01)
(58) Field of Classification Search
  USPC .......................... 105/26.05, 27, 35, 49–51, 61
  See application file for complete search history.

(56) References Cited

U.S. PATENT DOCUMENTS 7,046,531 B2  5/2006  Zocchi et al.
7,444,944 B2 *  11/2008  Kumar et al. .............. 105/26.05
7,838,162 B2 *  11/2010  Hong ............................ 429/447
2005/0074665 A1  4/2005  Spaziante et al.
2008/0292964 A1  11/2008  Kazacos et al.
2009/0297938 A1  12/2009  Hoofman et al.
2010/0092807 A1  4/2010  Sahu et al.
2011/0050174 A1  3/2011  King et al.

FOREIGN PATENT DOCUMENTS

WO  WO 2010/023033 A1  3/2010

* cited by examiner

*Primary Examiner* — Robert J. McCarry, Jr.
(74) *Attorney, Agent, or Firm* — Finnegan, Henderson, Farabow, Garrett & Dunner, LLP (57) ABSTRACT

A power converter may include an uncharged tank for storing fluid including uncharged electrolytes. The power converter may include a plurality of parallel-connected reaction cells configured to receive the fluid from the uncharged tank and an input voltage, and charge the uncharged electrolytes. The power converter may also include a charged tank configured to receive fluid from the plurality of parallel-connected reaction cells. The power converter may also include a first pump configured to pump the fluid from the plurality of parallel-connected reaction cells to the charged tank. The power converter may include a plurality of series-connected reaction cells configured to receive fluid from the charged tank and provide electric power at an output voltage.

5 Claims, 5 Drawing Sheets

FLOW BATTERY POWER CONVERTER

TECHNICAL FIELD

This disclosure relates generally to power converters and, more specifically, to DC-to-DC converters implemented using flow battery technology.

BACKGROUND

In electronic systems, each subsystem may have its own voltage-level requirement that differs from that supplied by the system's power source. For example, different subsystems in a locomotive may operate on direct current ("DC") at different voltage levels. DC-to-DC converters ("DC-DC converters") allow a single source to power multiple subsystems operating at different voltage levels.

Traditionally, switch-mode converters are generally preferred over other types because they are capable of producing an output voltage higher than the input voltage and are capable of bidirectional operation at a higher efficiency than linear converters. However, switch-mode converters have their own limitations. For example, the conversion speed is limited by the switching frequency of the transistors comprising the converter. Furthermore, switching losses resulting from the resistance of each transistor may decrease the efficiency of the converter. Additionally, while DC-DC converters operate by temporarily storing energy in their transistors, these converters do not provide a means of storing energy for any significant amount of time if, for example, the load on the output of the converter shuts down for a period of time.

One solution for power conversion is described in U.S. Patent Application Publication No. US 2011/0050174 A1 ("the '174 publication"). The '174 publication is directed to an apparatus for transferring energy using onboard power electronics. The apparatus includes a bidirectional DC-DC voltage converter coupled to an energy storage device. The apparatus also includes a controller configured to control the bidirectional DC-DC converter to convert a first charging energy on a voltage bus into a second charging energy suitable for charging the energy storage device during a charging operation and to monitor a voltage of the energy storage device during the charging operation.

Although the system disclosed in the '174 publication may be capable of transferring energy to transient or pulsed loads, the solution disclosed in the '174 publication may still suffer from a number of possible drawbacks. For example, the DC-DC converters of the '174 publication require transistors and are thus subject to the same conversion rate and efficiency limitations discussed above. Additionally, the apparatus the '174 publication discloses can store energy on the input side of the converter, where the energy storage device connects to the converter, but not within the converter itself.

The presently disclosed systems and methods may mitigate or overcome one or more of the above-noted drawbacks and/or other problems in the art.

SUMMARY

According to one aspect, the present disclosure is directed to a power converter. The power converter may include an uncharged tank for storing fluid including uncharged electrolytes and a plurality of parallel-connected reaction cells configured to receive fluid from the uncharged tank and an input voltage. The parallel-connected reaction cells may be configured to charge uncharged electrolytes. The power converter may also include a charged tank configured to receive fluid from the plurality of parallel-connected reaction cells. The power converter may further include a first pump configured to pump fluid from the plurality of parallel-connected reaction cells to the charged tank and a plurality of series-connected reaction cells configured to receive the fluid from the charged tank and provide electric power at an output voltage.

In accordance with another aspect, the present disclosure is directed to a method of controlling an electrical output of a power converter. The power converter may include an uncharged tank for storing fluid including uncharged electrolytes and a first plurality of pumps for pumping fluid containing uncharged electrolytes from the uncharged tank to a plurality of parallel-connected reaction cells. The method may include receiving a signal indicative of an input voltage associated with at least one of the plurality of parallel-connected reaction cells and receiving a signal indicative of an amount of fluid stored in the uncharged tank. The method may further include controlling a flow rate of at least one of the first plurality of pumps based on the signals indicative of the input voltage and the amount of fluid stored in the uncharged tank.

According to yet another aspect, a locomotive may include a plurality of axles and a plurality of pairs of wheels, each pair of wheels connected to one of the plurality of axles. The locomotive may also include a plurality of traction motors, each traction motor coupled to one of the axles. The locomotive may further include a power converter configured to at least partially power at least one of the plurality of traction motors. The power converter may include an uncharged tank for storing fluid including uncharged electrolytes and a plurality of parallel-connected reaction cells configured to receive fluid from the uncharged tank and an input voltage. The parallel-connected reaction cells may be configured to charge uncharged electrolytes. The power converter may also include a charged tank configured to receive fluid from the plurality of parallel-connected reaction cells. The power converter may further include a first pump configured to pump fluid from the plurality of parallel-connected reaction cells to the charged tank and a plurality of series-connected reaction cells configured to receive the fluid from the charged tank and provide electric power at an output voltage.

DETAILED DESCRIPTION

Figure 1:
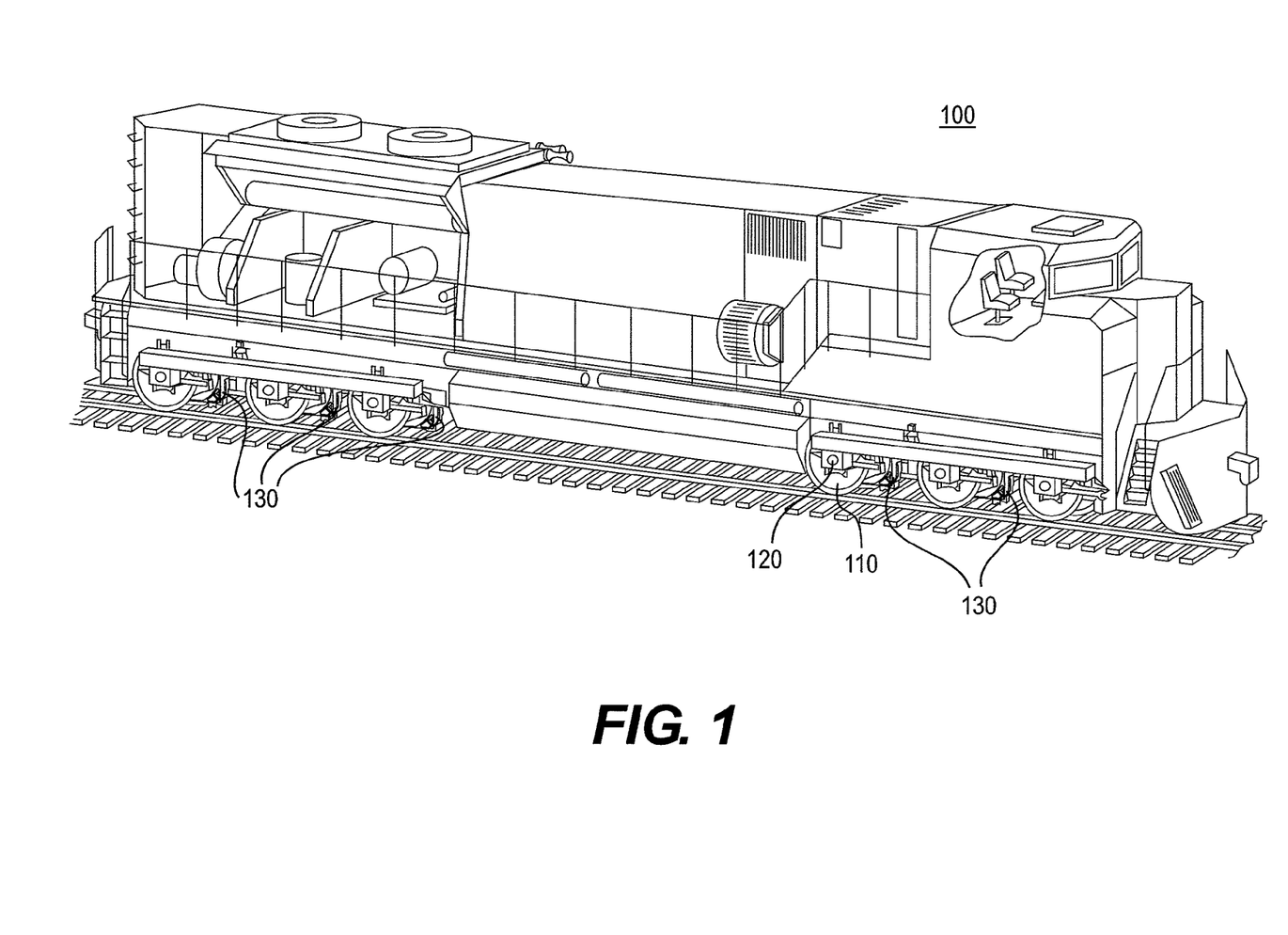
FIG. 1 is a perspective view of an exemplary embodiment of a locomotive.

FIG. 1 shows a perspective view of an exemplary embodiment of a locomotive 100 in which systems and methods for energy distribution may be implemented consistent with the disclosed embodiments. Locomotive 100 may be any electrically powered rail vehicle employing traction motors for propulsion. Furthermore, any electrically powered vehicle could also incorporate the systems and methods for energy distribution consistent with the disclosed embodiments.

According to the exemplary embodiment illustrated in FIG. 1, locomotive 100 may include a plurality of pairs of wheels 110, with each pair of wheels 110 connected to an axle 120. Each axle 120 may be rotatably coupled to a traction motor 130 that is configured to provide force for propelling locomotive 100. Locomotive 100 may also include a power converter 140 configured to at least partially power the plurality of traction motors 130 of locomotive 100. For example, when one or more of traction motors 130 supplies force for propelling locomotive 100, traction motors 130 provide a load on a power converter 140 (see FIG. 2).

Figure 2:
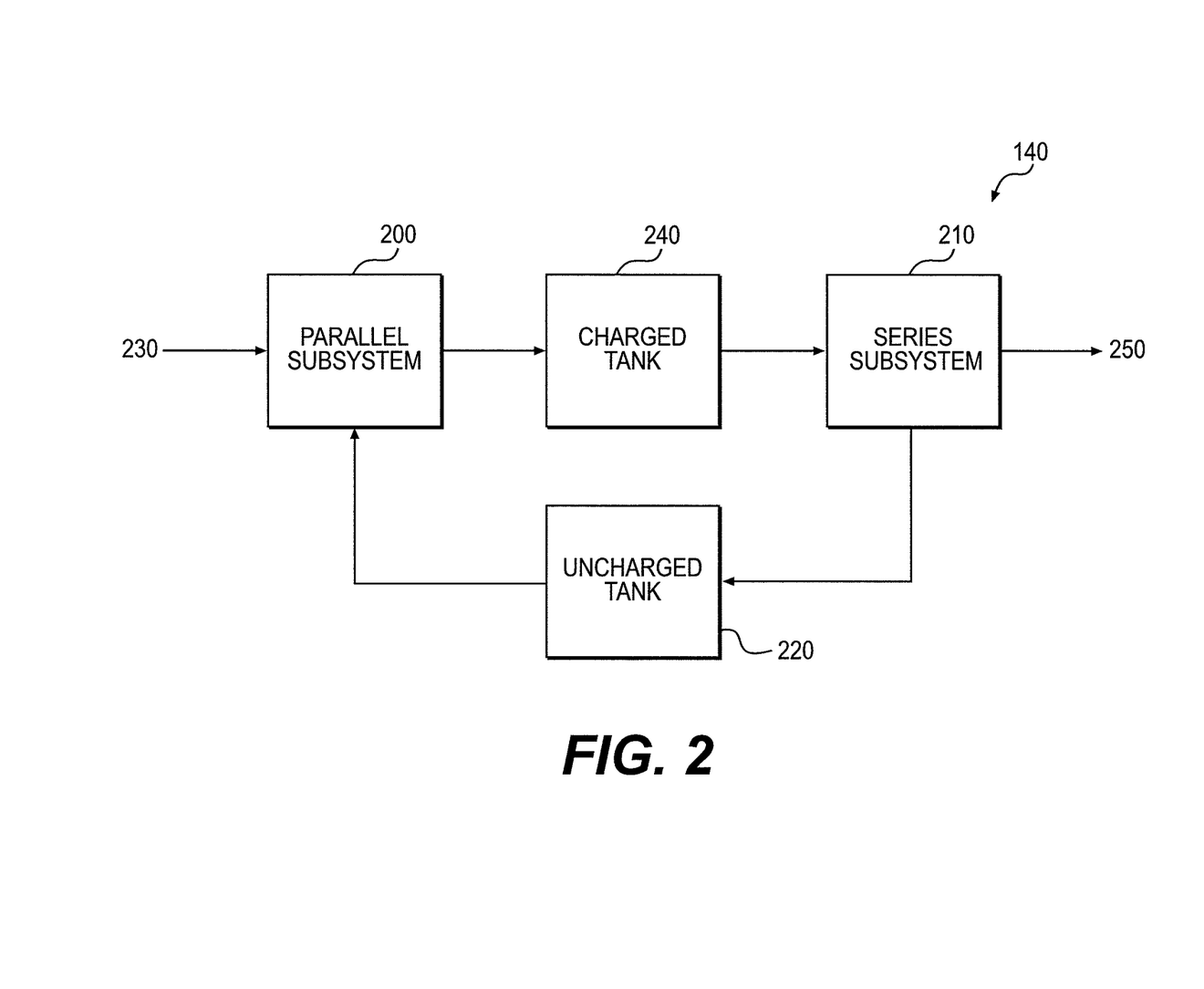
FIG. 2 is a block diagram illustrating the basic functionality of an exemplary power converter.

FIG. 2 is a block diagram illustrating the basic functionality of an exemplary power converter 140. As shown in FIG. 2, power converter 140 may include a parallel subsystem 200 and a series subsystem 210, and these subsystems may perform different but complementary actions on electrolytes that travel through power converter 140. Parallel subsystem 200 may receive uncharged electrolytes from an uncharged tank 220 and electrical energy from input voltage 230. Parallel subsystem 200 may charge the electrolytes using input voltage 230 and output the fluid containing the charged electrolytes into charged tank 240. Series subsystem 210 may receive fluid containing charged electrolytes from charged tank 240. By discharging the electrolytes, series subsystem 210 may release an output voltage 250. Uncharged tank 220 may receive the fluid containing discharged electrolytes from series subsystem 210. As discussed above, parallel subsystem 200 may receive uncharged electrolytes from uncharged tank 220. This cycle of charging and discharging the electrolytes may continue to convert the input voltage to the output voltage. Each subsystem is discussed in more detail below.

Figure 3:
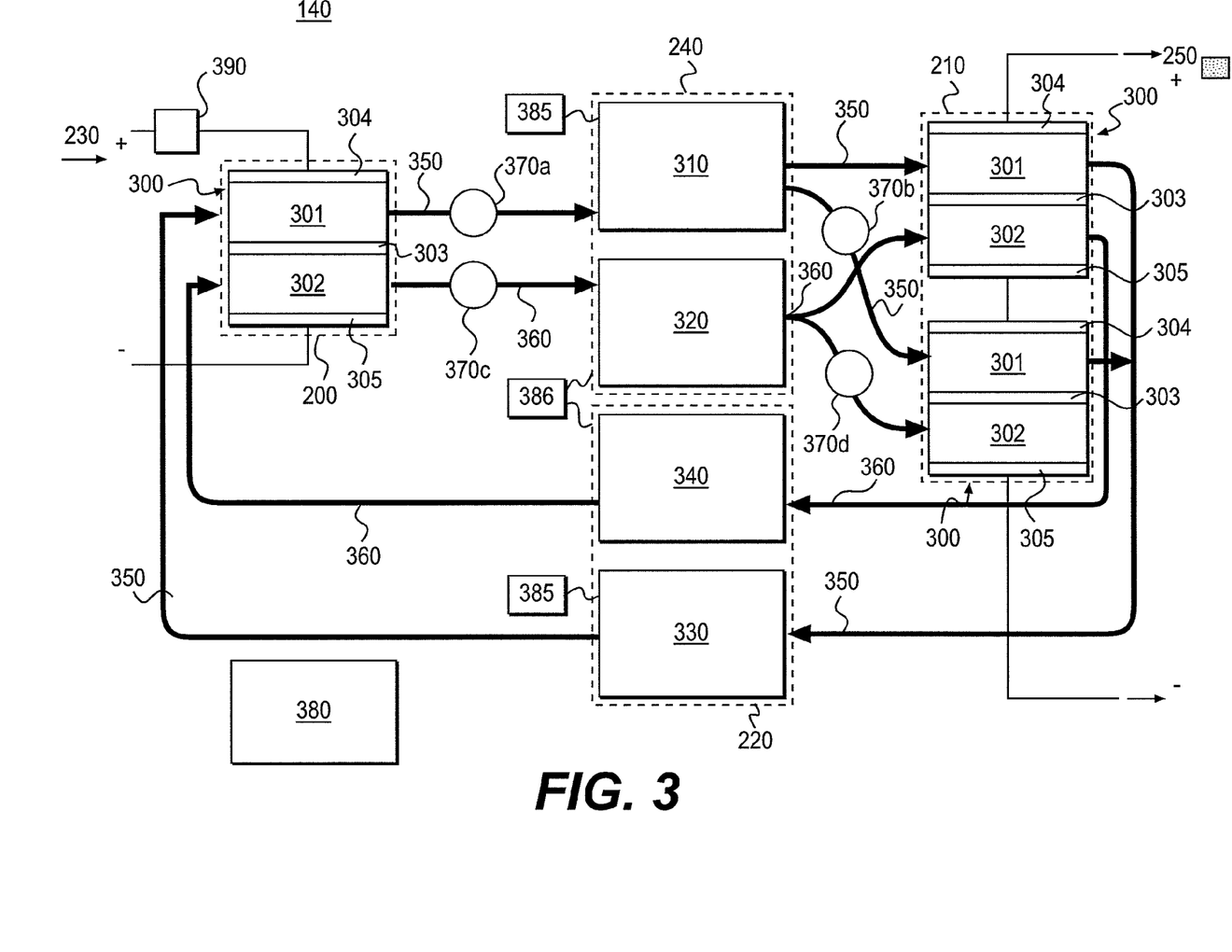
FIG. 3 is a block diagram of an exemplary embodiment of a power converter.

FIG. 3 provides a block diagram of an exemplary power converter 140 that illustrates the functionality of reaction cells 300 contained in parallel and series subsystems 200 and 210. Each subsystem 200 and 210 may include a plurality of reaction cells 300. For simplicity, FIG. 3 illustrates parallel subsystem 200 containing only one reaction cell 300 and series subsystem 210 containing two reaction cells 300. Other configurations of power converter 140 may include more reaction cells 300 (see FIG. 4).

Each reaction cell 300 may include two half-cells 301 and 302 separated by a membrane 303. Each reaction cell 300 is capable of consuming electricity or providing electricity based on chemical reactions caused by two electrolytes. In power converter 140, reaction cells 300 of parallel subsystem 200 may consume electricity from input voltage 230, and reaction cells 300 of series subsystem 210 may provide electricity as output voltage 250.

For reaction cell 300 to provide energy, the two electrolytes, which act as energy carriers, may each be delivered into one of the two half-cells 301 and 302. In the exemplary embodiment shown in FIG. 3, for reaction cells 300 of series subsystem 210 to produce output voltage 250, half-cell 301 may receive positively charged electrolytes, and half-cell 302 may receive negatively charged electrolytes. Membrane 303 may prevent the two electrolytes from mixing with one another but may allow selected ions to pass through to complete a reduction-oxidation ("redox") reaction, which causes electricity to flow through reaction cell 300. This process may create a voltage difference between a pair of electrodes 304 and 305 associated with reaction cell 300. In power converter 140, output voltage 250 equals the sum of the voltages through each of the series-connected reaction cells 300.

For reaction cell 300 of parallel subsystem 200 to charge electrolytes, the chemical energy contained in the electrolytes may be released in a reverse reaction that may use electrical energy that reaction cell 300 receives through electrodes 304 and 305. For example, half-cells 301 and 302 may each receive a type of uncharged electrolytes. To charge the electrolytes, input voltage 230 is applied to electrodes 304 and 305 of reaction cell 300 in parallel subsystem 200. Membrane 303 may prevent the two electrolytes from mixing, but when electricity is applied, a reduction reaction may occur in one electrolyte mixture and an oxidation reaction may occur in another electrolyte mixture. During this process, selected ions may pass through membrane 303.

The electrolytes may contain one or more dissolved electroactive species. The two electrolytes may include positively charged electrolytes and negatively charged electrolytes. For example, the electrolytes may include vanadium ions in different oxidation states. Alternatively, the electrolytes may include polysulfide bromide, uranium, zinc-cerium, or zinc-bromide. There are a variety of other chemical compounds and combinations known in the art that are capable of acting as electroactive species, and it is contemplated that the electrolytes used in exemplary power converter 140 may include one or more of those compounds and combinations.

Exemplary power converter 140 may include a plurality of tanks that comprise charged tank 240 as shown in FIG. 2. For example, power converter 140 in FIG. 3 includes a first and a second charged tank 310 and 320. First and second charged tanks 310 and 320 may be located separately from reaction cells 300 and may be configured to deliver the stored electrolytes to reaction cells 300 of series subsystem 210. For example, first charged tank 310 may store positively charged electrolytes, and second charged tank 320 may store negatively charged electrolytes. In this configuration, first charged tank 310 may provide positively charged electrolytes to half-cell 301 of reaction cell 300 in series subsystem 210, and second charged tank 320 may provide negatively charged electrolytes to half-cell 302 of reaction cell 300 in series subsystem 210.

Power converter 140 may also include a plurality of tanks comprising uncharged tank 220. As shown in FIG. 3, power converter 140 includes a first and a second uncharged tank 330 and 340. First and second uncharged tanks 330 and 340 may be located separately from reaction cells 300 and may be configured to deliver stored electrolytes to reaction cells 300 of parallel subsystem 200. For example, first uncharged tank 330 may store uncharged catholytes, and second uncharged tank 320 may store uncharged anolytes. In this configuration, first uncharged tank 330 may provide electrolytes to half-cell 301 of reaction cell 300 in parallel subsystem 200, and second uncharged tank 320 may provide electrolytes to half-cell 302 of reaction cell 300 in parallel subsystem 200.

According to some embodiments, first charged tank 310 may be configured to provide positively charged electrolytes to one or more of half-cells 301. Similarly, second charged tank 320 may be configured to provide negatively charged electrolytes to one or more of half-cells 302. In this manner, first and second tanks 310 and 320 may supply electrolytes to one or more reaction cells 300 to provide output voltage 250. Likewise, uncharged tanks 330 and 340 may supply uncharged electrolytes to one or more reaction cells 300 to charge electrolytes from input voltage 230.

The reaction cells 300 of parallel subsystem 200 and series subsystem 210 interact through conduits and electrolyte tanks. A series of conduits 350 illustrate the path of positively charged electrolytes. In parallel subsystem 200, uncharged electrolytes may be contained in fluid stored in first uncharged tank 330. Then, the electrolytes may travel into half-cell 301 of reaction cell 300 in parallel subsystem 200. In power converters 140 containing more than one reaction cell 300 in parallel subsystem 200, the electrolytes may travel through conduits 350 and through half-cells 301 of all the reaction cells 300 in parallel subsystem 200, such that all of the fluid travels through at least one half-cell 301 in parallel subsystem 200.

A series of conduits 360 show the path of negatively charged electrolytes through power converter 140. In parallel subsystem 200, uncharged electrolytes may be stored in second uncharged electrolyte tank 340. Then, the electrolytes may travel into half-cell 302 of reaction cell 300 in parallel subsystem 200. In power converters 140 containing a plurality of parallel-connected reaction cells, the electrolytes may travel through conduits 360 and through half-cells 302 of reaction cells 300 in parallel subsystem 200, such that all of the fluid travels through at least one half-cell 302.

In each of the one or more reaction cells 300 of parallel subsystem 200, the uncharged electrolytes in half-cell 301 interact with the uncharged electrolytes in half-cell 302 through membrane 303. When input voltage 230 is applied to electrodes 304 and 305, the electrolytes become charged as they pass through reaction cell 300. The fluid containing the charged electrolytes may then travel through conduits 350 and 360 to reach first and second tanks 310 and 320. In some embodiments, positively charged electrolytes may travel through conduit 350 to first charged electrolyte tank 310. Similarly, negatively charged electrolytes may travel through conduit 360 and to second charged tank 320.

The fluid containing positively charged electrolytes stored in first charged tank 310 may travel through conduits 350 until it reaches half-cell 301 of each of the series-connected reaction cells 300 comprising series subsystem 210. In a similar manner, the fluid containing negatively charged electrolytes may travel from second charged tank 320 through conduits 360 to half-cell 302 of each of the series-connected reaction cells 300. In some embodiments, the amount of positively-charged electrolytes reaching each half-cell 301 may be the same for each reaction cell 300 of series subsystem 210. Similarly, the amount of negatively charged electrolytes reaching each half-cell 302 may be the same. For example, in FIG. 3, the fluid contained in charged electrolyte tank 310 separates such that each half-cell 301 in series subsystem 210 receives one-half of the fluid. It is contemplated, however, that the proportion of fluid reaching each half-cell 301 from first charged tank 310 and/or the proportion of fluid reaching each half-cell 302 from second charged tank 320 may differ depending on the power requirements and electrolyte characteristics of a particular embodiment.

As positively charged electrolytes travel through series-connected reaction cells 300, the redox reaction may cause current to flow from reaction cells 300 of series subsystem 210 and discharge the electrolytes. The now-discharged electrolytes may travel through conduits 350 and 360, returning to uncharged electrolyte tanks 330 and 340, respectively. As long as input voltage 230 is applied to parallel subsystem 200, this cycle may continue.

The current resulting from this process may travel through series subsystem 210 to produce output voltage 250. As the voltage through components connected in parallel is the same through each component, each reaction cell 300 of parallel subsystem 200 applies input voltage 230 to the uncharged electrolytes. The voltage produced by the same electrolytes travelling through each reaction cell 300 of series subsystem 210 may be approximately equal to input voltage 230. As voltage through components connected in series adds, output voltage 250 may be proportional to the input voltage and may depend on the size of each reaction cell 300 in power converter 140 and the number of reaction cells 300 in series subsystem 210. In the example shown in FIG. 3, if each reaction cell 300 is the same size, the output voltage 250 may be approximately twice the input voltage, since there are two series-connected reaction cells 300.

In addition to conduits 350 and 360, power converter 140 may also include a plurality of pumps 370a and 370b to control the flow of fluid among the reaction cells 300 and first charged tank 310. For example, first pump 370a may be configured to pump the fluid from half-cells 301 of the plurality of parallel-connected reaction cells 300 in parallel subsystem 200 to first charged tank 310 through conduit 350 at a flow rate. In a similar manner, power converter 140 may include second pump 370b configured to pump the fluid from first charged tank 310 to half-cells 301 of the plurality of series-connected reaction cells 300 in series subsystem 210 through conduit 350. First and second pumps 370a and 370b may be located anywhere along conduit 350.

Additional pumps may pump charged electrolytes through second charged tank 320 and half-cells 302. For example, a third pump 370c may be configured to pump fluid from the plurality of parallel-connected reaction cells 300 of parallel subsystem 200 to second charged tank 320 through conduit 360 at a flow rate. Additionally or alternatively, a fourth pump 370d may be configured to pump fluid from second charged tank 320 to the plurality of series-connected reaction cells 300 of series subsystem 210 through conduit 360 at a flow rate. Third and fourth pumps 370c and 370d may be located anywhere along conduit 350.

Exemplary power converter 140 may include a controller 380 to control the operation of one or more pumps 370a-d. According to some embodiments, controller 380 may be configured to change the flow rates of one or more pumps 370 a-d. Additionally or alternatively, controller 380 may also be configured to receive signals indicative of the real-time status of power converter 140, optionally including individual components of power converter 140. Controller 380 may embody a single microprocessor or multiple microprocessors that include a means for controlling the operation of pumps 370a-d and for receiving signals from other components. Numerous commercially available microprocessors can be configured to perform the functions of controller 380. It should be appreciated that controller 380 could readily embody a general machine or engine microprocessor capable of controlling numerous machine or engine functions. Controller 380 may include all the components required to run an application such as, for example, a memory, a secondary storage device, and a processor, such as a central processing unit or any other means known. Various other known circuits may be associated with controller 380, including power source circuitry (not shown) and other appropriate circuitry.

According to some embodiments, controller 380 may be configured to control the operation of one or more pumps 370 a-d based on, for example, the amount of fluid stored in at least one of first charged tank 310 and first uncharged tank 330. In some embodiments, power converter 140 may include a tank sensor 385 configured to determine the amount of fluid stored in first charged tank 310 and/or first uncharged tank 330 and send a first signal indicative of the amount(s) to controller 380. Controller 380 may control the flow rates of first pump 370a and/or second pump 370b based on data communicated in the first signal. Similarly, power converter 140 may include a second tank sensor 386 configured to determine the amount of fluid stored in second charged tank 320 and/or second uncharged tank 340 and send a third signal indicative of the amount(s) to controller 380. Controller 380 may control the flow rates of third pump 370c and/or fourth pump 370d based on data communicated in the first and/or third signals.

Additionally or alternatively, controller 380 may be configured to control the operation of one or more pumps 370 based on the magnitude of input voltage 230. According to some embodiments, controller 380 may be configured to receive a second signal indicative of input voltage 230. For example, controller 380 may receive signals from an input sensor 390 that is configured to measure input voltage 230. Based on this information, controller 380 may adjust the flow rate of at least one pump 370. For example, controller 380 may increase the flow rate of at least one pump 370 in response to an increase in input voltage 230.

Figure 4:
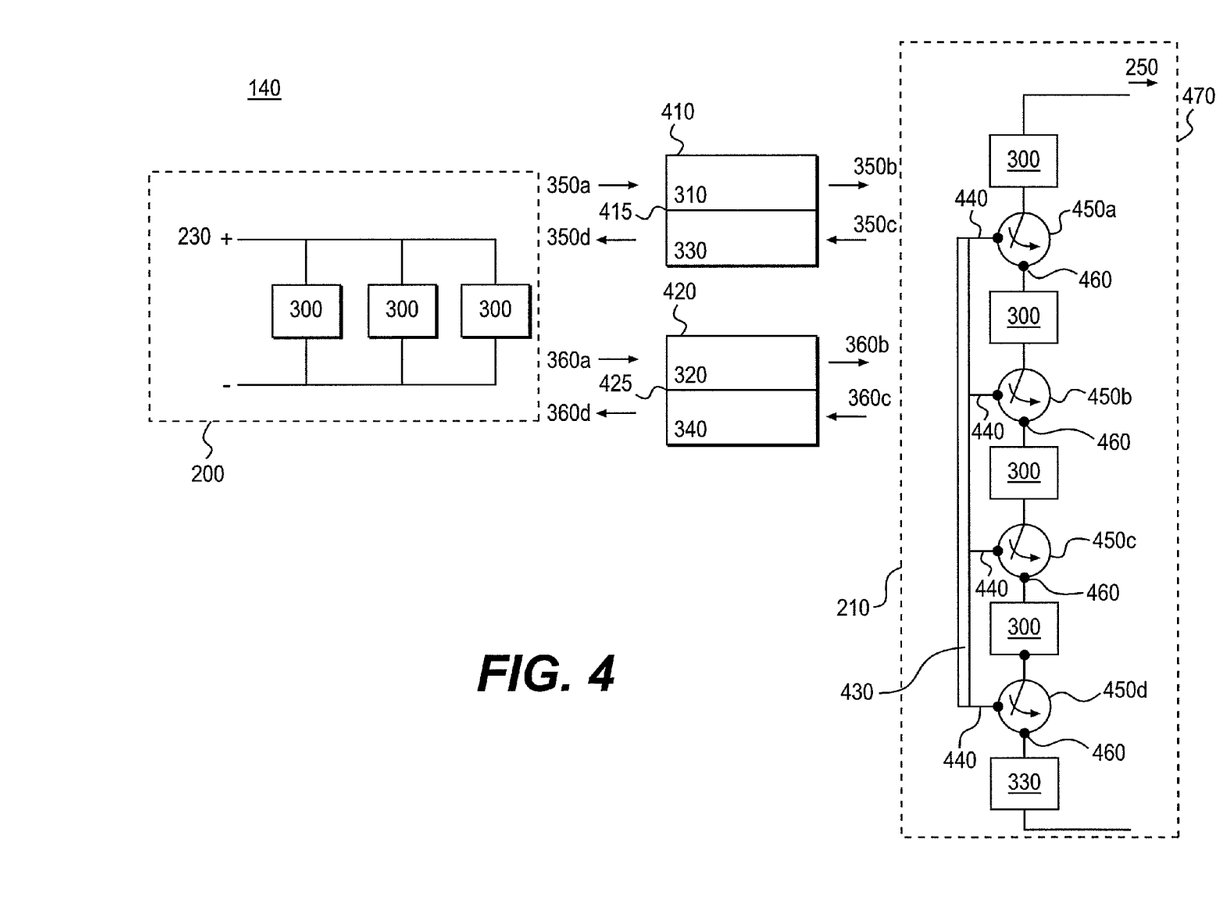
FIG. 4 is a block diagram of another exemplary embodiment of a power converter.

FIG. 4 is a block diagram of an exemplary power converter 140 including isolation circuitry. For clarity, conduits 350 through which positively charged electrolytes travel are shown as 350a, 350b, 350c, and 350d, which illustrate the flow cycle of positively charged electrolytes but do not show the details of how the fluid separates and travels through each half-cell 301 in parallel subsystem 200 and series subsystem 210 before combining again in first charged electrolyte tank 310 and first uncharged electrolyte tank 330, respectively. Likewise, conduit 360 is shown as 360a, 360b, 360c, and 360d, which illustrate the flow of negatively charged electrolytes but do not show the details of how the fluid separates and travels through each half-cell 302 in parallel subsystem 200 and series subsystem 210 before combining again in second charged electrolyte tank 320 and second uncharged electrolyte tank 340, respectively. The details of the flow path of power converter 140 shown in FIG. 4 will be apparent by referencing FIG. 3.

According to some embodiments and as shown in FIG. 4, the electrolyte tanks may be configured to store both charged and uncharged electrolytes. For example, first charged electrolyte tank 310 and first uncharged electrolyte tank 330 may be two parts of a first electrolyte tank 410. First electrolyte tank 410 may include a first tank separator 415 configured to prevent charged electrolytes from mixing with uncharged electrolytes. In a similar manner, second charged electrolyte tank 320 and second uncharged electrolyte tank 340 may be two parts of a second electrolyte tank 420. Second electrolyte tank 420 may include a second tank separator 425. In some embodiments, the relative charge of the electrolytes stored in tanks 310, 320, 330, and 340 of first and second electrolyte tanks 410 and 420 varies during operation of power converter 140. That is, tanks 330 and 340 may start out storing discharged electrolytes, but through the course of operation, tanks 330 and 340 may store electrolytes that have been charged via, for example, chemical reactions occurring when discharged electrolytes travel through reaction cells 300 of parallel subsystem 200.

Tank separators 415 and 425 may be movable and able to move within electrolyte tanks 410 and 420, respectively, to account for changing volumes of charged and discharged electrolytes as power converter 140 operates to charge or discharge the electrolytes. According to some embodiments, tank separators 415 and 425 may be buoyant. Alternatively or additionally, tank separators 415 and 425 may include flow passages that may be selectively opened and closed to allow electrolytes to travel through separators 415 and 425 to the other side of electrolyte tanks 410 and 420 for mixing. Other configurations of tank separators 415 and 425 may be utilized.

As discussed above, the magnitude of output voltage 250 may vary according to the number of reaction cells 300 in series subsystem 210 and the magnitude of input voltage 230. For exemplary power converter 140 in which the number of reaction cells 300 in series subsystem 210 is fixed, it may not be possible to change the ratio of input voltage 230 to output voltage 250. Therefore, power converter 140 as shown in FIG. 4 may include a shunt circuit 430 associated with at least one of the plurality of series-connected reaction cells 300 in series subsystem 210. Shunt circuit 430 may include a plurality of shunt terminals 440. Shunt circuit 430 and shunt terminals 440 may comprise any electrically conductive material. Power converter 140 may also include a plurality of switches 450 (e.g., switches 450a, 450b, 450c, and 450d, as shown in FIG. 4). Each switch 450a-d may be arranged between two of the plurality of the series-connected reaction cells 300. Each switch 450a-d may be a single-pole, double-throw switch configured to switch between a cell terminal 460 of one of the series-connected reaction cells 300 and at least one of the plurality of shunt terminals 440 of shunt circuit 430.

By selectively switching one or more of switches 450a-d between cell terminal 460 and shunt terminal 440, the number of series-connected reaction cells through which current flows to an output terminal 470 may be altered to change the ratio of input voltage 230 to output voltage 250. Controller 380 may be configured to determine a desired voltage for output voltage 250 and control the opening and closing of each of the plurality of switches 450a-d based on the desired output voltage level. For example, if the desired output voltage approximately equals three times the value of input voltage 230, it would be desirable for only three reaction cells 300 to be electrically engaged in series subsystem 210. In the exemplary power converter shown in FIG. 4, controller 380 may open switches 450a and 450d so that each connects to one shunt terminal 440 and close switches 450b and 450c such that each connects to a corresponding cell terminal 460. In this configuration, current may flow through three of the five reaction cells 300 in series subsystem 210. Optionally, controller 380 may also send signals to pumps 370 corresponding with the two remaining reaction cells 300 to decrease or stop fluid flow through those reaction cells.

Figure 5:
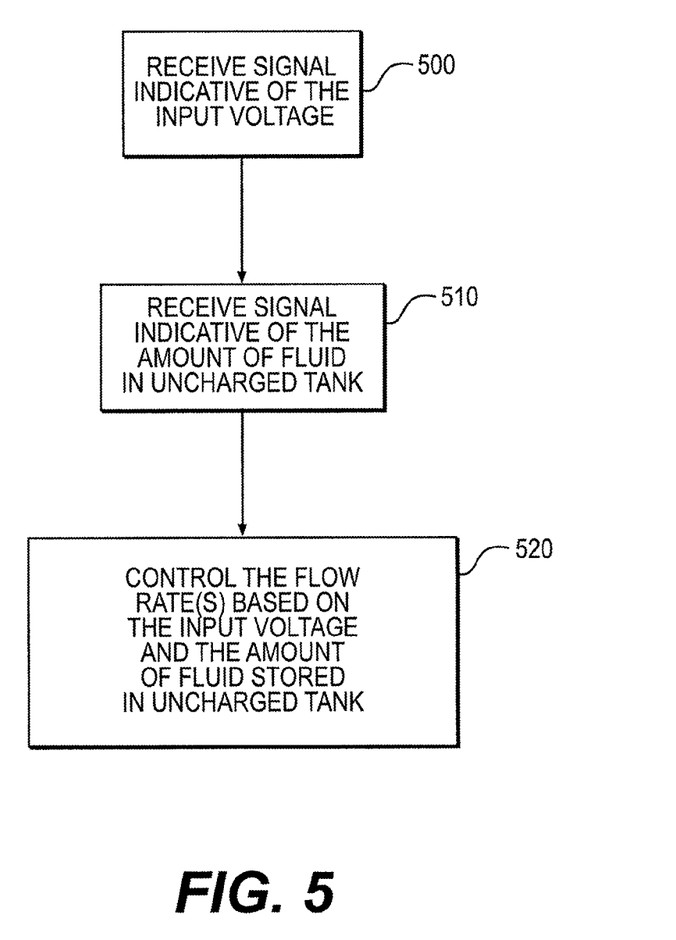
FIG. 5 is a flowchart of an exemplary method for controlling the voltage output of a power converter.

FIG. 5 is a flow chart depicting an exemplary method of controlling an electrical output of power converter 140. At step 500 controller 380 may receive a signal indicative of input voltage 230 associated with at least one of the plurality of parallel-connected reaction cells 300 in parallel subsystem 200, and at step 510, controller 380 may receive a signal indicative of an amount of fluid stored in first uncharged tank 330. According to some embodiments, the method may also include receiving a signal indicative of an amount of fluid stored in first charged tank 310. At step 520 controller 380 may control the flow rate of rate at least one of a first plurality of pumps 370a and 370c based on input voltage 230 and the amount of fluid stored in first uncharged tank 330. For example, the first plurality of pumps 370a, 370c may include first and third pumps 370a and 370c configured to pump fluid from parallel subsystem 200 to charged tanks 310 and 320.

According to some embodiments, the method may also include monitoring the electrical output of power converter 140. For example, controller 380 may receive a signal indicative of a characteristic of the output, such as output voltage 250. The method may include controlling the flow rate of at least one of a second plurality of pumps 370b and 370d associated with first charged tank 310 based on the amount of fluid stored in first charged tank 310 and the electrical output of power converter 140. The second plurality of pumps 370b and 370d may include second and fourth pumps 370b and 370d configured to pump fluid from charged tanks 310 to series subsystem 210.

According to some embodiments, the method for controlling power converter 140 may also include ensuring that tanks 310, 320, 330, and 340 do not become too high or too low on fluid. For example, the method may include, when the amount of fluid stored in first uncharged tank 330 reaches a predefined fill level, controller 380 turning off at least one of the second plurality of pumps 370. For example, the predefined fill level may be close to the maximum capacity of uncharged tanks 330 and/or 340. Controller 380 may allow parallel subsystem 200 to draw a certain amount of fluid from uncharged tanks 330 and/or 340 before allowing more fluid to enter these tanks. Once this occurs, and the amount of fluid stored in uncharged tanks 330 and/or 340 drops below a predefined low level, controller 380 may increase the flow rate of at least one of the second plurality of pumps 370b and 370d. The predefined low level may be low enough to allow more fluid to enter uncharged tanks 330 and/or 340 without risking an overflow. Likewise, when the amount of fluid stored in charged tank 310 and/or 320 reaches a second predefined fill level, controller 380 may suspend or eliminate the flow provided by at least one of the first plurality of pumps 370b and 370d. When the amount of fluid stored in charged tank 310 and/or 320 reaches a second predefined low level, controller 380 may turn on or increase the flow rate of at least one of the first plurality of pumps 370a and 370c. The second predefined fill level and second predefined low level may be chosen to prevent charged tanks 310 and/or 320 from becoming too high or too low on fluid, based on the electrical and chemical characteristics of power converter 140.

The method for controlling embodiments of power converter 140 that include isolation circuitry may include determining a desired output voltage for power converter 140 and a switch position for each of the plurality of switches 450a-d, as well as determining a number of series-connected reaction cells 300 electrically connected to the output of power converter 140 based on the switch positions of each of the plurality of switches 450a-d. Next, controller 380 may select a target number of series-connected reaction cells 300 of series subsystem 210 to operate based on the desired output voltage 250 and input voltage 230. When the number of series-connected reaction cells 300 to operate is different from the number of series-connected reaction cells 300 electrically connected to output terminal 470, controller 380 may selectively operate at least one of the plurality of switches 450a-d to isolate or connect at least one of the plurality of series-connected reaction cells and control pumps 370 associated with reaction cell 300 that was isolated or connected to change the flow of fluid into that reaction cell 300.

INDUSTRIAL APPLICABILITY

The disclosed systems and methods provide a robust solution for power conversion. As a result, the negative effects of transient or pulsed loads on the power efficiency of a system implementing this solution may be diminished compared to a system implementing a switch-mode power converter.

The presently disclosed power converter may have several advantages. First, because embodiments of the presently disclosed power converter may be implemented without switches, they may not suffer switching losses resulting from the resistance of each transistor. Likewise, the rate of power conversion in this solution may not be limited by the switching frequency of the switches.

Additionally, the presently disclosed systems and methods may provide a power converter that is capable of storing energy within the converter itself, such as in the form of chemical energy in electrolyte tanks or in reaction cells. Energy that has already been at least partially converted from the input voltage level to the output voltage level can be stored in the event that a load connected to the output temporarily stops drawing current. For power converters designed for high power applications, this may result in significant energy savings, especially if the power converter is used for transient or pulsed loads.

It will be apparent to those skilled in the art that various modifications and variations can be made to the exemplary flow battery power converters. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A locomotive comprising;
   a plurality of axles;
   a plurality of pairs of wheels, each pair of wheels connected to one of the plurality of axles;
   a plurality of traction motors, each traction motor coupled to one of the axles; and
   a power converter configured to at least partially power at least one of the plurality of traction motors, the power converter including:
      an uncharged tank for storing fluid including uncharged electrolytes;
      a plurality of parallel-connected reaction cells configured to receive fluid from the uncharged tank and an input voltage, the parallel-connected reaction cells being configured to charge uncharged electrolytes;
      a charged tank configured to receive fluid from the plurality of parallel-connected reaction cells;
      a tank sensor configured to send a first signal indicative of an amount of fluid stored in at least one of the uncharged tank and the charged tank;
      a first pump configured to pump fluid from the plurality of parallel-connected reaction cells to the charged tank;
      a plurality of series-connected reaction cells configured to receive the fluid from the charged tank and provide electric power at an output voltage;
      a second pump configured to pump fluid from the charged tank to the plurality of series-connected reaction cells;
      a shunt circuit associated with at least one of the plurality of series-connected reaction cells and including a plurality of shunt terminals; and
      a plurality of switches, each switch arranged between two of the plurality of series-connected reaction cells and configured to switch between a cell terminal of one of the plurality of series-connected reaction cells and at least one of the plurality of shunt terminals of the shunt circuit; and
      a controller configured to:
         receive the first signal and a second signal indicative of the input voltage; and
         control a flow rate of the first pump based on at least one of the first signal and the second signal.

2. The locomotive of claim 1, wherein the controller is further configured to:
   determine a desired voltage level for the output voltage; and
   control each of the plurality of switches based on the desired voltage level.

3. The locomotive of claim 2, wherein the power converter further includes:
   a second charged tank for storing fluid containing negatively charged electrolytes;

a third pump configured to pump fluid from at least one of the plurality of parallel-connected reaction cells to the second charged tank; and a fourth pump configured to pump fluid from the second charged tank to the plurality of series-connected reaction cells.

4. The locomotive of claim 3, wherein the power converter further includes a second tank sensor configured to send a third signal indicative of an amount of fluid stored in the second charged tank, wherein the controller is configured to control a flow rate of the third pump and a flow rate of the fourth pump based on at least one of the first signal, the second signal, and the third signal.

5. The locomotive of claim 4, wherein the controller is further configured to:

detect a change in the input voltage;

change the flow rate of at least one pump based on the change in the input voltage to maintain the desired output voltage.

* * * * *